United States Patent
Arnold et al.

[11] Patent Number: 5,802,870
[45] Date of Patent: Sep. 8, 1998

[54] SORPTION COOLING PROCESS AND SYSTEM

[75] Inventors: Edward Charles Arnold, Naperville; Stephen R. Dunne, Algonquin; Syed M. Taqvi, Rolling Meadows, all of Ill.

[73] Assignee: UOP LLC, Des Plaines, Ill.

[21] Appl. No.: 850,544

[22] Filed: May 2, 1997

[51] Int. Cl.[6] .............................. F25B 17/08; F25B 15/00
[52] U.S. Cl. ................................ 62/480; 62/104; 62/105; 62/481
[58] Field of Search .............................. 62/480, 481, 476, 62/101, 103, 104, 105, 141, 148

[56] References Cited

U.S. PATENT DOCUMENTS

| | | | |
|---|---|---|---|
| 4,138,850 | 2/1979 | Tchernev | 60/641 |
| 4,548,046 | 10/1985 | Brandon et al. | 62/79 |
| 4,610,148 | 9/1986 | Shelton | 62/480 |
| 4,637,218 | 1/1987 | Tchernev | 62/106 |
| 4,660,629 | 4/1987 | Maier-Laxhuber | 165/104 |
| 5,279,359 | 1/1994 | Erickson | 165/104.12 |
| 5,388,637 | 2/1995 | Jones et al. | 165/104.12 |
| 5,477,705 | 12/1995 | Meunier | 62/480 |
| 5,518,977 | 5/1996 | Dunne et al. | 502/68 |
| 5,585,145 | 12/1996 | Maier-Laxhuber | 427/380 |

OTHER PUBLICATIONS

Aittomaecki, A. & Haerkoenen, M., Article "Internal Regeneration of the Adsorption Process" presented at Solid Sorption Refrigeration Symposium in Paris, France, Nov. 18–20, 1992.

Chang, S. & Roux, J.A., article "Thermodynamic Analysis of a Solar Zeolite Refrigeration System," in *Journal of Solar Energy Engineering*, Aug. 1985, vol. 107, pp. 189–194.

Meyers, Robert A., editor, Chapter 3.3 of Handbook of Petroleum Refining Processes, Second Edition, published by McGraw–Hill, NY, 1996.

*Primary Examiner*—William Doerrler
*Attorney, Agent, or Firm*—Thomas K. McBride; John G. Tolomei; Richard P. Silverman

[57] ABSTRACT

A process and a system are disclosed for sorption heating and cooling which comprise at least 2 sorption zones. Each sorption zone comprises a heat transfer zone and an adsorption zone containing a sorbent such that the heat transfer zone is in intimate thermal contact with the adsorption zone to permit an essentially uniform temperature lengthwise through the sorption zone and thereby employ essentially all of the sorbent in the process at all times. The process comprises passing heat transfer streams such as a hot stream, a cold stream, and a recirculation stream through the heat transfer zone and routing a refrigerant through the adsorption zone of each sorption zone to affect a desorption stroke, an intermediate stroke and an adsorption stroke in the adsorption zone. Rotary and multi-port valves are employed to circulate the refrigerant and the heat transfer streams. The resulting sorption cooling process achieves a significantly higher coefficient of performance than the prior art.

32 Claims, 5 Drawing Sheets

SORPTION COOLING PROCESS AND SYSTEM

FIELD OF THE INVENTION

The present invention relates to a process for heating or cooling of a fluid stream by adsorption of a refrigerating fluid on a solid adsorbent. More particularly, the invention relates to a process and system for the continuous use of adsorbent in sorption cooling and sorption heating systems.

BACKGROUND OF THE INVENTION

Heat driven heat pumps which use solid adsorbent beds to adsorb and desorb a refrigerant are known in the art. These solid adsorbent beds adsorb and desorb a refrigerant vapor in response to changes in the temperature of the adsorbent. One common example of such solid adsorbent material is a molecular sieve such as a zeolite. Other materials which exhibit this phenomena are silica gel, alumina, activated charcoal, and some metal salts. Most any liquid which can be vaporized can be employed as the refrigerant. Water is commonly used as a refrigerant when zeolite is the solid adsorbent.

In the operation of sorption cooling systems, generally there are two or more solid beds containing a solid adsorbent. The solid adsorbent beds desorb refrigerant when heated and adsorb refrigerant vapor when cooled. In this manner the beds can be used to drive the refrigerant around a heat pump system to heat or cool another fluid such as a process stream or to provide space heating or cooling. In the heat pump system, commonly referred to as the heat pump loop, the refrigerant is desorbed from a first bed as the bed is heated to drive the refrigerant out of the first bed and the refrigerant vapor is conveyed to a condenser. In the condenser, the refrigerant vapor is cooled and condensed. The refrigerant condensate is then passed through an isolation valve to a lower pressure through an expansion valve and the low pressure condensate passes to an evaporator where the low pressure condensate is heat exchanged with the process stream or space to be conditioned to revaporize the condensate. When further heating no longer produces desorbed refrigerant from the first bed, the first bed is isolated and allowed to return to the adsorption conditions. When the adsorption conditions are established in the first bed, the refrigerant vapor from the evaporator is reintroduced to the first bed to complete the cycle. Generally two or more solid adsorbent beds are employed in a typical cycle wherein one bed is heated during the desorption stroke and the other bed is cooled. The time for the completion of a full cycle of adsorption and desorption is known as the "cycle time." The heating and cooling steps are reversed when the beds reach the desired upper and lower temperature limits of the adsorption cycle. The upper and lower temperatures will vary depending upon the selection of the particular refrigerant fluid and the adsorbent. The efficiency in cooling is called the "coefficient of performance" (COP) and is generally the ratio of the cooling effect divided by the heat input. The thermodynamic aspects of developing a zeolite-water adsorption refrigeration unit are well known. An article entitled, "Thermodynamic Analysis of a Solar Zeolite Refrigeration System," by S. Chang and J. A. Roux, which appeared in the Journal of Solar Energy Engineering, August 1985, Volume 107, pages 189–194, provides a discussion of the main parameters, including adsorber properties.

U.S. Pat. No. 4,610,148 to Shelton discloses a heat driven heat pump system wherein a temperature gradient is established lengthwise in the solid adsorbent bed in order to establish a thermal wave in the bed. As a heat transfer fluid is circulated through the system by a reversible pumping means, the beds are cycled between an upper and a lower operating temperature, creating the thermal wave within the bed of solid adsorbent. The heat transfer fluid always flows serially from a heater through a bed heat exchanger heating that bed while cooling the heat transfer fluid. Then the heat transfer fluid is passed through the cooling heat exchanger to further cool the heat transfer fluid, and the further cooled heat transfer fluid is passed through the other bed heat exchanger to cool that bed while heating the transfer fluid. Finally, the thus heated heat transfer fluid is returned to the heater to raise the heat transfer fluid to the original temperature. The solid adsorbent beds are constructed of one or more tubes through which the heat transfer fluid is passed and around which the solid adsorbent is held by a housing shell. In a similar apparatus for use with an ammonia refrigerant, U.S. Pat. No. 5,388,637 discloses the use of a finned tube matrix comprising a bonded activated carbon and a resol bonder tightly adjoined to the fins of the tube to provide high rates of heat transfer between the refrigerant and the heat transfer fluid.

Some thermodynamic processes for cooling and heating by adsorption of a refrigerating fluid on a solid adsorbent use zeolite and other sorption materials such as activated carbon and silica gel. In these processes, the thermal energy from adsorbing zeolite in one place is used to heat desorbing zeolite located in another place. U.S. Pat. No. 4,138,850 relates to a system for solar heat utilization employing a solid zeolite adsorbent mixed with a binder, pressed, and sintered into divider panels and hermetically sealed in containers. The U.S. Pat. No. 4,637,218 to Tchernev relates to a heat pump system using zeolites as the solid adsorbent and water as the refrigerant wherein the zeolite is sliced into bricks or pressed into a desired configuration to establish an hermetically sealed space and thereby set up the propagation of a temperature front, or thermal wave through the adsorbent bed. The bricks used in U.S. Pat. No. 4,637,218 are preferably not more than 10 mm in thickness. U.S. Pat. No. 5,477,705 discloses an apparatus for refrigeration employing a compartmentalized reactor and alternate circulation of hot and cold fluids to create a thermal wave which passes through the compartments containing a solid adsorbent to desorb and adsorb a refrigerant.

U.S. Pat. No. 4,548,046 relates to an apparatus for cooling or heating by adsorption of a refrigerating fluid on a solid adsorbent. The operations employ a plurality of tubes provided with parallel radial fins, the spaces between which are filled or covered with solid adsorbent such as Zeolite 13X located on the outside of the tubes.

In an article by Aittomaecki, A. and Haerkoenen, M., titled, "Internal Regeneration of the Adsorption Process," and presented at the Solid Sorption Refrigeration Symposium—Paris, France, Nov. 18–20, 1992, the authors indicate that the draw back of the Tchernev/Shelton cycle which creates a thermal wave in the bed in the direction of the flow of the heat transfer fluid is that the cycle time must be short enough to maintain the operation temperatures of the outflowing fluids at the desired level. However, at the same time changes in the operation temperatures decrease the net adsorption, and this leads to a decrease in the COP of the basic process. Thus, there are finite limits to the thermal wave processes which must have a cycle time long enough to maintain adsorbent regeneration efficiency, but short enough to maintain the overall COP.

U.S. Pat. No. 5,279,359 to Erickson discloses an apparatus and a process for sorption heat pumping using a multiplicity of intermittent cyclic triplex sorption modules. The cyclic triplex sorption modules comprise hermetically sealed tubes, each of which contains at least two solid sorbents and is filled with a refrigerant. The preferred refrigerant is ammonia and the solid sorbents are salts such as $BaCl_2$, $SiCl_2$, $CaCl_2$, $MnCl_2$, $FeCl_2$ and $SiBr_2$.

U.S. Pat. No. 4,660,629 to Maier-Laxhuber et al. discloses a continuous adsorption cooling device comprising a plurality of adsorption containers filled with adsorbent wherein the adsorption containers are rotated through flow segments which form passageways for a heat carrier stream. The adsorption containers contain an adsorption substance from which an operating substance is extracted by absorbing heat from a heat carrier flow and into which the operating substance is readsorbed, emitting heat to a further heat carrier flow. In U.S. Pat. No. 5,585,145, filed Feb. 16, 1995, Maier-Laxhuber disclose a method for coating a heat exchanger surface with a solid adsorbent.

In adsorber/generator based cooling systems the most significant parameter is the overall heat transfer coefficient between the adsorbent bed and the cooling or heating gases per unit weight of adsorbent in the system. This parameter has been related in the literature to the cooling power per kilogram of adsorbent. The higher the cooling power, the more efficient the adsorber/generator system. Current systems are limited by requiring a high adsorbent regenerator temperature or a long cycle time to achieve relatively low cooling power values.

Prior methods of using zeolite adsorbents in devices for cooling or heating by adsorption of a refrigerating fluid on a solid adsorbent have been inefficient and difficult to prepare. Those methods of preparation included cutting natural rock into thin bricks and mounting these bricks on to heat exchange surfaces or casting powdered zeolites and mixtures thereof with clays into panels or slabs for direct contact with fluids. Prior devices have sought to minimize heat transfer losses in systems for sorption cooling by employing flat containers filled with adsorbent suspended in heat carrier streams or with slabs of adsorbent wired or mounted next to heat transfer surfaces. In one case, finned tubing was employed as a support for a resin bonded adsorbent to provide more thermal conductivity to the adsorbent. Many of these devices incorporated further flow enhancers such as sorbate conduits, weirs, valves, and wicks to establish maximum contact of the operating fluid and the adsorbent with heat exchange surfaces. These devices are limited by their ability to maintain the regenerating efficiency of the adsorbent. Devices are sought which simplify the manufacture of the entire sorption cooling system and improve the overall system power per unit-mass of sorbent.

It is the object of the instant invention to provide an improved sorption cooling system for use in waste heat recovery, space heating, and air conditioning systems which is not limited by the regeneration efficiency of the adsorbent.

SUMMARY OF THE INVENTION

The present invention is directed to an improved sorption cooling process and system. It was discovered that the combination of a rotary distribution valve to circulate heat transfer fluid and refrigerant to and from sorption zones in a sorption cooling/heating process wherein the sorption zones contain heat exchange zones and adsorption zones which permit essentially uniform temperature gradients throughout the sorption zones result in surprisingly high COP's. The essentially uniform temperature throughout the sorption zones are achieved by coating the heat exchange zones with thin layers of a coating containing an adsorbent. The uniform temperature gradient permits essentially all of the adsorbent in the sorption zone to actively be employed in the adsorption and desorption without generating a thermal wave in the adsorption zone. A thermal wave limits the amount of active adsorbent to the portion of the adsorption zone immediately adjacent to the crest of the thermal wave, resulting in reduced operating temperatures and a lower overall efficiency.

In broad terms, the present invention provides a process for sorption heating and cooling comprising a series of steps. In step (a), a first hot stream is supplied to a first sorption zone of at least 2 sorption zones. Each sorption zone comprises a heat transfer zone and a separate adsorption zone, wherein each adsorption zone contains a sorbent. The heat transfer zone is in intimate indirect thermal contact with said adsorption zone to permit an essentially uniform temperature throughout the sorption zone to desorb a refrigerant vapor from the adsorption zone of the first sorption zone at an upper pressure and provide a hot exit stream from the heat transfer zone of the first sorption zone. In step (b), the refrigerant vapor stream is passed to a cooler and condenser zone to provide a condensate stream, the pressure of the condensate stream is reduced to a lower pressure to provide a reduced pressure condensate. The reduced pressure condensate is passed to an evaporator zone to provide a revaporized refrigerant stream. In step (c), a cold stream is passed to the heat transfer zone of a second sorption zone and a cold exit stream is recovered, and simultaneously the revaporized refrigerant stream is conducted to the adsorption zone of the second sorption zone to adsorb the revaporized refrigerant. In step (d), simultaneously the passing of refrigerant vapor from said first sorption zone is terminated, the passing of said hot stream to the heat transfer zone of the first sorption zone is terminated, the passing of the cold stream to the second sorption zone is terminated, and a recirculation stream is passed between the heat transfer zone of the first sorption zone and the heat transfer zone of the second sorption zone. The above steps (a)–(d) are repeated to provide a sorption cooling or heating cycle wherein said first sorption zone and the second sorption zone alternately undergo a desorption stroke in step (a), an adsorption stroke in step (c), and an intermediate stroke in step (d) between alternate adsorption and desorption strokes.

In accordance with the present invention, a process is provided for sorption heating and cooling. The process comprises a series of steps. A first hot stream is supplied through a first rotary valve section to a first sorption zone of at least 2 sorption zones to desorb a refrigerant vapor from the adsorption zone of the first sorption zone at an upper pressure and provide a hot exit stream from the heat transfer zone of the first sorption zone. Each sorption zone comprises a heat transfer zone and a separate adsorption zone. The adsorption zone contains a sorbent coated surface and the heat transfer zone is in intimate indirect thermal contact with the adsorption zone to permit essentially uniform temperature throughout the sorption zones. The refrigerant vapor stream is passed through a second rotary valve section to a cooler and condenser zone to provide a condensate stream. The pressure of the condensate stream is reduced to a lower pressure to provide a reduced pressure condensate. The reduced pressure condensate is passed to an evaporator zone to provide a revaporized refrigerant stream. A cold stream is passed through the first rotary valve section to the heat transfer zone of a second sorption zone and a cold exit stream is recovered. Simultaneously, the revaporized refrigerant stream is conducted through a third valve zone to the adsorption zone of the second sorption zone to adsorb the revaporized refrigerant. The second rotary valve section is advanced to terminate the passing of refrigerant vapor from the first sorption zone through the second rotary valve section, and the first rotary valve section is advanced to simultaneously terminate the passing of the hot stream to the heat transfer zone of the first sorption zone and terminate the passing of the cold stream to the second sorption zone. Simultaneously, a recirculation stream is passed through the first rotary valve section between the heat transfer zone of the first sorption zone and the heat transfer zone of the second sorption zone. The position of the first and second rotary valve sections is indexed in unison to repeat the above steps to provide a sorption cooling or heating cycle wherein the first sorption zone and the second sorption zone undergo a desorption stroke, an adsorption stroke, an intermediate stroke between alternate adsorption and desorption strokes.

In another aspect of the present invention, there is provided a process for sorption heating and cooling comprising a series of steps. A first hot stream is passed through a first rotary valve section and a first conduit to a first sorption zone of at least 2 sorption zones. Each sorption zone comprises a heat transfer zone and a separate adsorption zone. The adsorption zone contains a sorbent coated surface. The heat transfer zone is in intimate indirect thermal contact with the adsorption zone to permit an essentially uniform temperature throughout the sorption zone to desorb a refrigerant vapor from the adsorption zone of the first sorption zone at an upper pressure and to provide a hot exit stream from the heat transfer zone of the first sorption zone. The refrigerant vapor stream is passed through a second conduit and a second rotary valve section to a cooler and condenser zone to provide a condensate stream. The pressure of the condensate stream is reduced to a lower pressure to provide a reduced pressure condensate. The reduced pressure condensate is passed to an evaporator zone to provide a revaporized refrigerant stream. A cold stream is passed through the first rotary valve section and a third conduit to the heat transfer zone of a second sorption zone. A cold exit stream is recovered, and the revaporized refrigerant stream simultaneously conducted through a fourth conduit and a third valve zone to the adsorption zone of the second sorption zone to adsorb the revaporized refrigerant. The second rotary valve section is advanced to terminate the passing of refrigerant vapor from the first sorption zone through the second conduit and the second rotary valve section. The first rotary valve section is advanced to simultaneously terminate the passing of the hot stream through the first conduit to the heat transfer zone of the first sorption zone, to simultaneously terminate the passing of the cold stream through the third conduit to the second sorption zone, and to simultaneously recirculate a recirculation stream through a fifth conduit, the first rotary valve section, and the heat transfer zone of the first sorption zone, and the recirculation stream is passed through a sixth conduit and the first rotary valve section to the heat transfer zone of the second sorption zone. The position of the first and second rotary valve sections is indexed in unison to repeat the above steps in order to simultaneously alternate the conduits carrying the hot and cold streams, the refrigerant vapor and revaporized refrigerant stream, and the recirculation stream wherein the first and the second sorption zones undergo a desorption stroke, an adsorption stroke, and an intermediate stroke between alternate adsorption and desorption strokes to provide a continuous process.

In a further aspect of the present invention, there is provided a sorption cooling system which comprises a condenser, an evaporator, and at least two sorption zones. Each sorption zone contains a solid adsorbent selective for the adsorption of at least a portion of a refrigerant fluid, and contains a heat transfer section in close thermal communication with the solid adsorbent. The system also comprises a heat transfer fluid passage within the heat transfer section for a heat transfer fluid; a hot source; a cold source; and a single rotary distribution valve. The single rotary valve simultaneously and separately conveys the heat transfer fluid at a desorption temperature from the hot source to the heat transfer section of a first sorption zone in a desorption stroke to provide a desorbed refrigerant vapor and returns the hot heat transfer fluid to the hot source. The single rotary valve also simultaneously and separately conveys a cold heat transfer fluid at an adsorption temperature from the cold source to a second sorption zone in an adsorption stroke and returns the cold heat transfer fluid to the cold source. Further, the single rotary distribution valve simultaneously terminates the flow of refrigerant vapor to or from the first and second sorption zones while separately circulating a recirculation fluid in an intermediate stroke between a sorption zone having completed the desorption stroke. The single rotary distribution valve simultaneously and separately conveys at least a portion of the desorbed refrigerant vapor to the condenser to provide a condensate stream, and simultaneously and separately conveys the condensate stream to the evaporator under reduced pressure to provide a vaporized refrigerant stream, and simultaneously and separately conveys the vaporized refrigerant stream from the evaporator to the second sorption zone in the adsorption mode. The system includes a conduit for conveying the condensate stream from the condenser to the evaporator and a valve indexing driver to advance the single rotary distribution valve to simultaneously step the first sorption zone to the adsorption mode, simultaneously step the second sorption zone to the desorption mode, and simultaneously and alternately convey the heat exchange fluid to and from the hot source and the cold source provide a continuous sorption cooling system.

In a still further embodiment, the invention comprises a system for sorption cooling comprising a condenser, an evaporator, an isolation valve for conducting a condensed refrigerant from the condenser to the evaporator, and a plurality of sorption zones. Each sorption zone includes an adsorption zone containing a solid adsorbent. Each adsorption zone has an adsorption zone inlet and an adsorption zone outlet and contains a solid adsorbent for adsorbing a refrigerant in an adsorption mode and for desorbing the refrigerant in a desorption mode. Each adsorption zone has a first vapor conduit to conduct refrigerant from the adsorption zone outlet to the condenser and a second vapor conduit to conduct refrigerant from the evaporator to the adsorption zone inlet. In addition, each sorption zone has a separate heat transfer passage through which a hot working fluid is conducted during the desorption mode and through which a cold working fluid is conducted during the adsorption mode. The separate heat transfer section is in intimate indirect thermal contact with the adsorbent in the adsorption zone. The process further comprises a multi-port valve for conducting the hot working fluid through the separate heat transfer section of at least one sorption zone of the plurality of sorption zones and for simultaneously conducting the cold working fluid to a separate heat transfer passage of another sorption zone of the plurality of sorption zones in a cyclic manner to provide a continuous sorption cooling process.

DETAILED DESCRIPTION OF THE INVENTION

Figure 1:
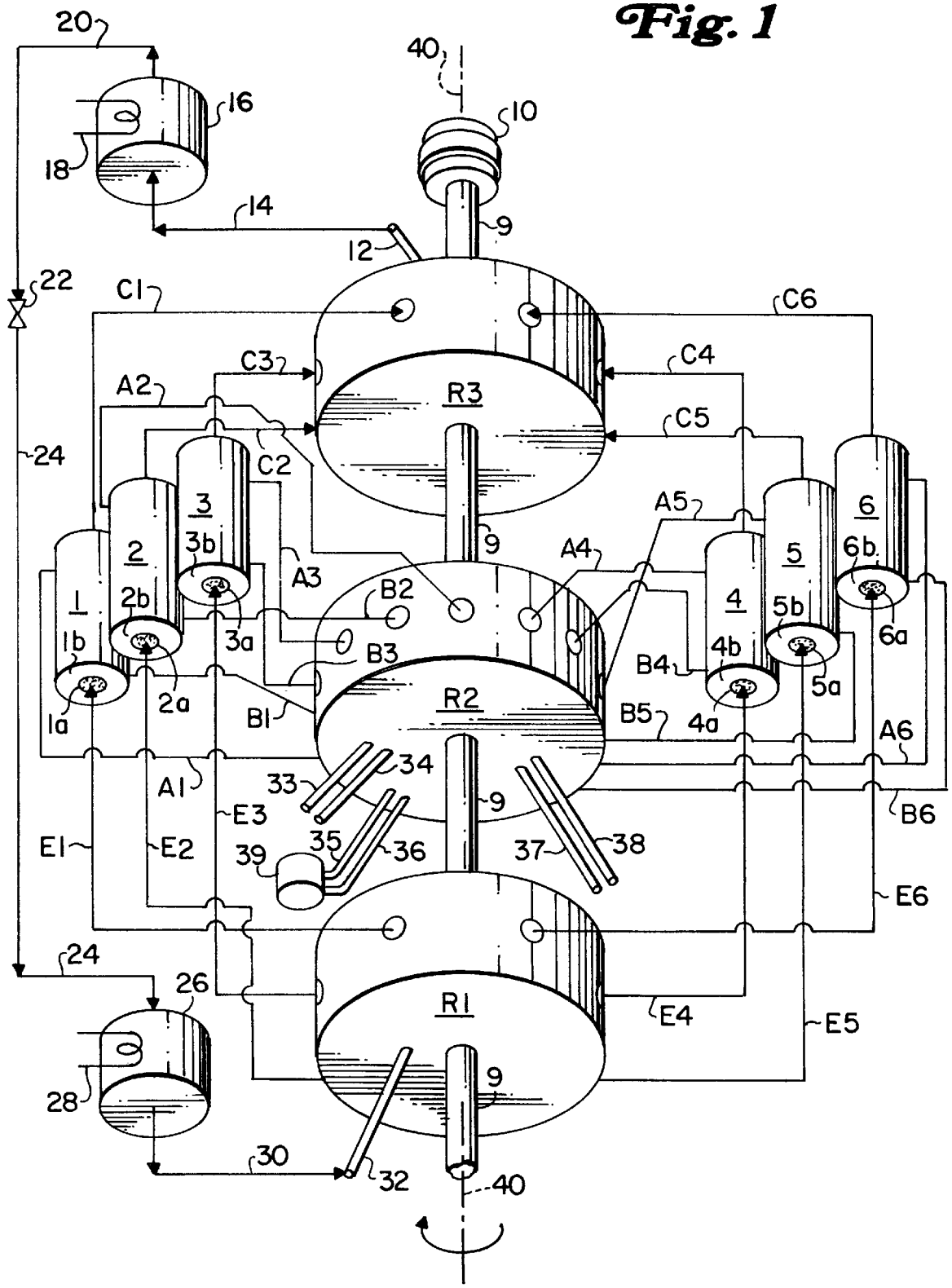
FIG. 1 is a flow diagram showing a rotary distribution a plurality of sorption zones.

The sorption cooling system of the present invention comprises the integration of a heat transfer circuit and a separate adsorption circuit, cycling between an adsorption mode and a desorption mode to isolate the pressure of the adsorption mode from the pressure of the desorption mode and expand a refrigerant at the surface of the evaporator to provide cooling. The heat transfer circuit provides a heat transfer fluid from a hot source to heat the adsorbent sections to produce desorption conditions and provide a heat transfer fluid from a cold source to produce adsorption conditions in a plurality of inter-connected adsorbent zones. In one embodiment, the heat build-up in an adsorbent zone at the completion of a desorption step is used to preheat another adsorbent zone which has completed the adsorption portion of the cycle and is about to undergo desorption. In the adsorption circuit, refrigerant vapor is permitted to flow from an evaporator to an adsorbent zone wherein the refrigerant vapor is adsorbed on a solid adsorbent. Preferably, the solid adsorbent is selected from the group consisting of Zeolite A, Zeolite X, Zeolite Y and mixtures thereof. More preferably, the solid adsorbent is selected from the group consisting of Zeolites Y-54, Y-74, Y-84, Y-85, low cerium rare earth exchanged Y-84, low cerium rare earth exchanged LZ-210 at a framework $SiO_2/Al_2O_3$ mol equivalent ratio of less than about 7.0, and mixtures thereof disclosed in U.S. Pat. No. 5,535,817 which is hereby incorporated by reference. At least one adsorbent zone is operated in the adsorption mode at any point in one cycle of the sorption cooling system. At the completion of the adsorption mode, the adsorbent zone is first preheated in an intermediate mode and then heated to desorption conditions at which time the adsorbed refrigerant vapor now at a higher pressure than the pressure at which it was adsorbed is desorbed and permitted to flow to a condenser. In the condenser the refrigerant vapor is cooled to produce a condensate. The condensate is passed to an expansion valve which reduces the pressure of the condensate to provide an expanded stream. The refrigerant leaves the condenser as a high pressure, medium temperature, saturated liquid and enters the expansion valve, where it expands irreversibly and adiabatically. It leaves the isolation valve as a low pressure, low-temperature, low quality vapor. The low pressure stream is passed to an evaporator wherein the low pressure stream expands and exchanges heat with the medium to be cooled and vaporizes a portion of the expanded stream to provide the refrigerant vapor and complete the sorption cooling cycle.

It has been recognized in the art that a multi-valve manifold, or a multi-port valve could be used as a replacement for a rotary valve in an adsorptive separation process. This is taught for instance in U.S. Pat. No. 3,510,423 at column 3, line 57, but the reference does not describe such valve arrangements with any specificity.

Multi-valve systems for use in adsorptive separation processes are shown in FIGS. 3A and 3B of U.S. Pat. No. 3,761,533 and FIGS. 3A–3B of U.S. Pat. No. 4,157,267. The latter reference discloses the use of three-way valves at column 4, line 15.

U.S. Pat. No. 4,705,627 discloses a rotary valve for distributing a fluid in various directions and collecting fluids from various directions. The rotary valve consists of 2 rotor disks having passages that constitute a part of complete passages through which the fluid runs. The rotary valve of the present invention consists of a plurality of rotor disks and corresponding stator rotatably disposed between the rotor disks in the conventional manner. The rotor comprises a plurality of concentric annular grooves that have conventionally been provided to a single contact surface between the rotor disk and the stator. The contact between the rotor disk and the stator is maintained by external pressure applied approximately equal to the fluid pressure in the annular groove over the contact area. The material of the rotary valve should be non-conductive and preferably a material having a self lubricating characteristic in the entire rotor or the contact surface of the rotor. Such self-lubricating materials include teflon, teflon-impregnated glass cotton, fluorocarbon graphite, poly acetal resins, polyamide resin, nylon, and polyester resin. Further, the rotor and/or the stator disk may be formed of plastic, ceramic, laminated fiber, rubber, wood, stainless steel, glass, and combinations thereof.

The cooling efficiency of the present invention can be expressed in terms of the amount of adsorbent and the degree to which that adsorbent is employed in the cooling process. It is believed that the high specific power of the sorption cooling system of the present invention is due in large part to the use of relatively low inventories of molecular sieve adsorbent in the adsorption zones which are in intimate, indirect thermal contact with the heat transfer zone of each sorption zone. The term "specific power" means the total cooling power divided by the adsorbent inventory where the total cooling power is the rate at which heat is removed from the system. When coatings of molecular sieve materials are employed on the heat transfer surfaces, the amount of heat transferred to the molecular sieve per unit time is dependent upon the thickness of the adsorbent material. The thickness of the adsorbent material relates to the sorption cooling process, in particular to the regeneration efficiency, by providing heat transfer resistance to the transfer of heat from the hot fluid to the molecular sieve and by providing mass transfer resistance to the desorbed refrigerant. Both the heat transfer resistance and the mass transfer resistance of the molecular sieve increase by the square of the thickness of the molecular sieve coating on the heat transfer surface. In fixed beds, or matrices of adsorbents where thermal waves are established, only a small portion along the length of the heat transfer surface (or length of bed) is actively employed at the appropriate desorption conditions. In the present invention, essentially the entire adsorption zone is actively employed by creating an essentially uniform temperature throughout the adsorbent zone. The uniform temperature profile performance of the coated heat exchange surfaces of the present invention was discovered by observing the differences between the inlet and the outlet heat transfer fluid temperatures at the beginning of the desorption step. It was found that the inlet and outlet temperature of the heat transfer fluid flowing through sections of coated tubes became essentially equivalent within 15 to 30 seconds of the introduction of the heat transfer fluid. This indicated that essentially the entire adsorbent coated surface was in active use at the desorption condition for essentially the entire desorption stroke. In contrast, a thermal wave process only employs that portion of the adsorbent at the crest of the thermal wave and the length of the desorption stroke must be sufficient to travel the entire length of the bed. Thus, the present invention achieves a greater cooling power by actively employing a greater mass of adsorbent (that is essentially the entire adsorbent zone) in short cycle times such as about 50 seconds up to about 480 seconds.

In accordance with the present invention, the adsorbents are applied to the inside or outside surfaces of tubes for use in the cooling and heating by adsorption of a refrigerating fluid by the method disclosed in U.S. Pat. No. 5,518,977 hereby incorporated by reference. The preferred tubes are thin-walled and may have a plurality of fins disposed on the outside surface of the tubes. The inside or the outside surface of the tube is coated with a thin layer of solid adsorbent of between about 0.1 and less than 3 mm thickness. Preferably, the layer of solid adsorbent such as zeolite has a uniform thickness of between about 0.1 and about 1.6 mm, and most preferably, the uniform thickness of the solid adsorbent layer is between about 0.4 and 1.2 mm. The coated tube zones or adsorbent sections are typically evacuated to a high vacuum of at least 1 micron of mercury at a temperature of at least 350° C. for a period of at least about 2 to 4 hours; filled with a refrigerant such as water, ammonia, sulfur hexafluoride, light alcohols and mixtures thereof; and sealed in a closed system by providing a closed refrigerant circuit comprising a reservoir, an isolation valve, an evaporator, and a condenser. A suitable working fluid may be selected from the materials which remain the same phase over the range of temperature between the hot source and the cold source temperatures. The working fluid may be selected from the group consisting of water, alcohols, glycols, hydrocarbons, and mixtures thereof. Hydrocarbon fluids suitable for working fluids include process streams in refinery and petrochemical plants as stabilized product streams from catalytic conversion processes.

The exterior of the coated finned tubing of the present invention is uniformly coated with a coating comprising a solid adsorbent. The fins on the external surface of the tube may be any orientation including longitudinal (inline with the length of the tube) circular, or helical (perpendicular to the length of the tube). In addition the fins may be serrated or solid. A uniform coating on the finned tube is required to provide the maximum heat transfer through the tube wall and the fins by limiting the buildup of the coating on the external surface of the tube between the fins at their base. For example, the fin spacing, or space between the fins, on a helical finned tube will vary according to the outside diameter of the tube and the number of fins per unit of tube length. If the adsorbent coating layer is too thick; an insulating effect is produced. This insulating effect increases the resistance to heat transfer through the tube wall creating a temperature gradient between the tube or fin wall and the outside surface of the adsorbent. The formation of a temperature gradient in the adsorbent can potentially set up a thermal wave in the adsorbent which decreases the overall efficiency of the coated finned tube and the sorption cooling system. When the thickness of the coating layer at the tube surface is greater than the thickness of the coating layer on the fins, the efficiency of the tube drops off quickly. It was found that the thickness of the adsorbent layer deposited between the fins of helical fined tubes should be less than about two-thirds of the distance between the fins to avoid having the rate of heat transfer through the adsorbent become the controlling phenomenon and limited by the thermal conductivity of the adsorbent layer. Preferably the adsorbent layer on the finned tubes will be very thin. By a very thin adsorbent layer it is meant that the adsorbent coating layer on the finned tubes ranges between about 0.2 mm and about 2 mm. The selection of coated finned tubing for a sorption cooling or heating application is well known to those skilled in the heat transfer arts. By way of example and without limitation, preferably the outside diameter of the finned tubing ranges from about 9.5 mm to about 40 mm. Preferably the number of fins on helical finned tubes ranges between about 4 fins to about 20 fins over about a 25 mm (1 inch) length. Preferably the number of fins on longitudinal fins ranges from about 4 to about 32 per unit length (25 mm or 1 inch) of tube, and more preferably, the number of fins on a longitudinal finned tube ranges from about 4 to about 16 per unit length (25 mm or 1 inch) of tube. Preferably, the height of the fins extending from the base of either a longitudinal, circular, or a helical finned tube ranges from about 40 to about 70 percent of the outside diameter of the tube, and more preferably the height of the fins extending from the base of the tube ranges from about 50 to about 70 percent of the outside diameter of the tube. A parameter which is important to the operation of the sorption cooling or heating system is the adsorbent inventory-to-tube length ratio of the coated finned tube. Preferably the adsorbent inventory-to-tube length ratio of the helical coated finned tube ranges from about 0.1 to about 5 Kg/m. The use of coated finned tubes which provide a 7–19 fold increase in adsorbent surface area per tube significantly reduce the length of the tubes in a sorption cooling or heating system which provides substantial savings in capital cost.

In the operation of the sorption cooling system of the present invention, a portion of the adsorbent zones may be in an adsorption mode, an intermediate mode, or a desorption mode. In the typical installation at least one bed will be active in each of the operating modes at any given time in order to provide a continuous process. Generally, the adsorption mode comprises an adsorption temperature ranging from about 0° C. to about 100° C. and an adsorption pressure ranging from about 4 kPa (0.5 psia) to about 1.5 M kPa (220 psia). The desorption mode comprises a desorption temperature ranging from about 80° C. to about 350° C. and a desorption pressure ranging from about 2 kPa to about 1.5M Pa (220 psia).

The sorption zone may be operated with a variety of sorbent/refrigerant combinations or pairs. Examples of parings of such sorbent/refrigerant pairs include zeolite/water, zeolite/ethanol, zeolite/methanol, carbon/ethanol, zeolite/ammonia, zeolite/propane and silica gel/water. The operating conditions such as the evaporator temperature, the adsorption pressure, the condenser temperature and the desorption pressure will vary with the selection of the sorbent/refrigerant pair. For a zeolite/water pair, the evaporator temperature will range from about 0° C. to about 20° C., an adsorption pressure will range from about 0.5 to about 4 kPa, a condenser temperature will range from about 10°–60° C. and the condenser pressure will range from about 2 kPa to about 15 kPa. For an ammonia/zeolite pair, the evaporator temperature will range from about −30° to about 10° C., the adsorption pressure will range from about 100 kPa to about 600 kPa, the condenser temperature will range from about 20° to about 60° C. and the desorption pressure will range from about 800 kPa to about 2.5 MPa. For a zeolite/methanol pair, the evaporator temperature will range from about −30° to about 10° C., the evaporator pressure will range from about 0.4 to about 8 kPa, the condenser temperature will range from about 20° to about 60° C., and the desorption pressure will range from about 10 to about 100 kPa.

The intermediate mode is a transitional mode wherein the adsorbent zone to be regenerated or desorbed is preheated by exchanging heat with a recently regenerated adsorbent zone. The present invention discloses the use of a single rotary distribution valve to perform all of the switching of the heat transfer fluid between a hot source and a cold source, as well as the intermediate exchange of heat between adsorbent zones in the intermediate mode, can be accomplished with an inter-connected plurality of adsorbent zones and a system of distribution valves to provide a continuous process. Adsorptive separation processes using a valve means to change the location at which a feed and a desorbent stream enter a mass of adsorbent and the two points at which the raffinate stream and the extract separately leave the adsorbent are well known and used commercially to perform several separations. One of the most successful of theses processes utilizes what is referred to in the specific art as a "rotary valve." This device is similar to a complex multi-port stopcock or disk having four or more main flow lines which may be connected to any one of about 8 to 40 other lines leading to specific points in the adsorbent bed. Processes utilizing a rotary valve in a simulated moving bed adsorption process are described in U.S. Pat. Nos. 3,201,491 and 3,291,726. The rotary valve itself is described in U.S. Pat. Nos. 3,040,777 and 3,192,954 which are hereby incorporated by reference.

DETAILED DESCRIPTION OF THE DRAWINGS

The process of the present invention is hereinafter described with reference to the drawings which illustrate various aspects of the process. It is to be understood that no limitation to the scope of the claims which follow is intended by the following description. Those skilled in the art will recognize that these process flow diagrams have been simplified by the elimination of many necessary pieces of process equipment including some heat exchangers, process control systems, pumps, etc. It may also be discerned that the process flow depicted in the figures may be modified in many aspects without departing from the basic overall concept of the invention.

FIG. 1. is a schematic diagram of a sorption cooling apparatus which has a plurality of sorbent zones 1 through 6, a single rotary distribution valve with 3 sections R1, R2, and R3, an evaporator 26, a condenser 16, an isolation valve 22, and a motorized means 10 to step the rotary distribution valve. Each sorbent zone comprises a heat exchange zone 1b–6b in intimate indirect thermal communication with a separate adsorption zone 1a–6a having a heat transfer surface between the heat exchange zone and the adsorption zone. The adsorption zone may be any configuration which places the adsorbent in an adsorption zone and the adsorption zone in thermal communication with a heat transfer section. Such adsorption configurations may include packed beds, coated plates, coated tubes, filled tubes, and combinations thereof. Preferably, the adsorption zone comprises a solid adsorbent which is coated on the heat transfer surface in thermal communication with the heat transfer zone. The heat transfer surface may be a tube or a plate and may include an extended surface as provided by fins. The fins may be longitudinal (parallel to the direction of fluid flow through the tube) or helical (perpendicular to the fluid flow through the tube). The adsorbent coating may be on the inside or the outside of the tube and extended surfaces. It was found that the tube area requirement could be reduced significantly by using extended surface tubing which is externally coated with adsorbent. It was also discovered that the degree to which the tubing's surface is extended may actually reduce the efficiency of the overall system.

The sorption cooling system comprises a series of three rotary valve sections: a top valve section R3, a center valve section R2, and a bottom valve section R1, disposed along a shaft 9 having a central axis of rotation 40 such that when shaft 9 is stepped indexed or rotated by a valve indexing driver 10 such as a stepping motor, where all of the valve sections move simultaneously. The rotary valve section generally comprises a rotor having annular grooves and a stator having fluid delivery channels. The rotor, or rotational distribution plate rotates in a stepwise manner while in contact with the rotor which contains conduits connected to permanent lines to the adsorbent and heat transfer zones. The adsorbent zones 1–6 are distributed about the axis of rotation 40. Each of the adsorption sections has an inlet and an outlet end. A series of evaporator conduits E1–E6 place the bottom valve section R1 in fluid communication with the inlet end of the adsorption section 1a–6a of the adsorbent zones 1–6, respectively. Desorption conduits C1–C6 place outlet ends of the adsorption sections in fluid communication with the top valve section R3. A desorption header 12 and a desorbent line 14 place the top valve section R3 in fluid communication with a condenser 16. The condenser 16 has a cooling means 18 such as an air cooler comprising an exchange surface and optional fans for forced convection or as a cooling coil for circulating water, hydrocarbon, or alcohol to remove heat from the system and to condense refrigerant vapor to produce a condensate stream. A condensate stream is passed in line 20 through an isolation valve 22 to isolate the pressure of the refrigerant at the condensing condition from the pressure of the refrigerant at the evaporator conditions. In the evaporator, the refrigerant is expanded at the surface of the evaporator 26 to produce an expanded fluid stream 24 at a lower pressure than the condensate stream. The expanded fluid stream 24 is passed to the evaporator 26. In the evaporator 26, the expanded fluid is heated in evaporator 26 by a heating means 28 which is generally used to exchange heat with the surroundings or an external process stream to be cooled. Heating the expanded fluid in the evaporator produces a refrigerant vapor which is passed to the bottom valve section R1 via line 30 and stationary (non-rotating) evaporator header 32. Hot source inlet 33 and outlet 34, pump around inlet 35 and outlet 36 and cold source inlet 37 and outlet 38 provide the stationary (non-rotating) inlet and outlet headers for heat transfer fluid from the external hot source, the cold source, and a pump around pump 39 (between pump around inlet 35 and outlet 36) forcing the exchange of heat transfer fluid between adsorbent zones. A hot fluid pump (not shown) at the hot source inlet 33 and a cold fluid pump (not shown) at the cold source inlet 37 may be employed to move the working fluid between the hot and cold sources and the sorption zones.

Figure 2:
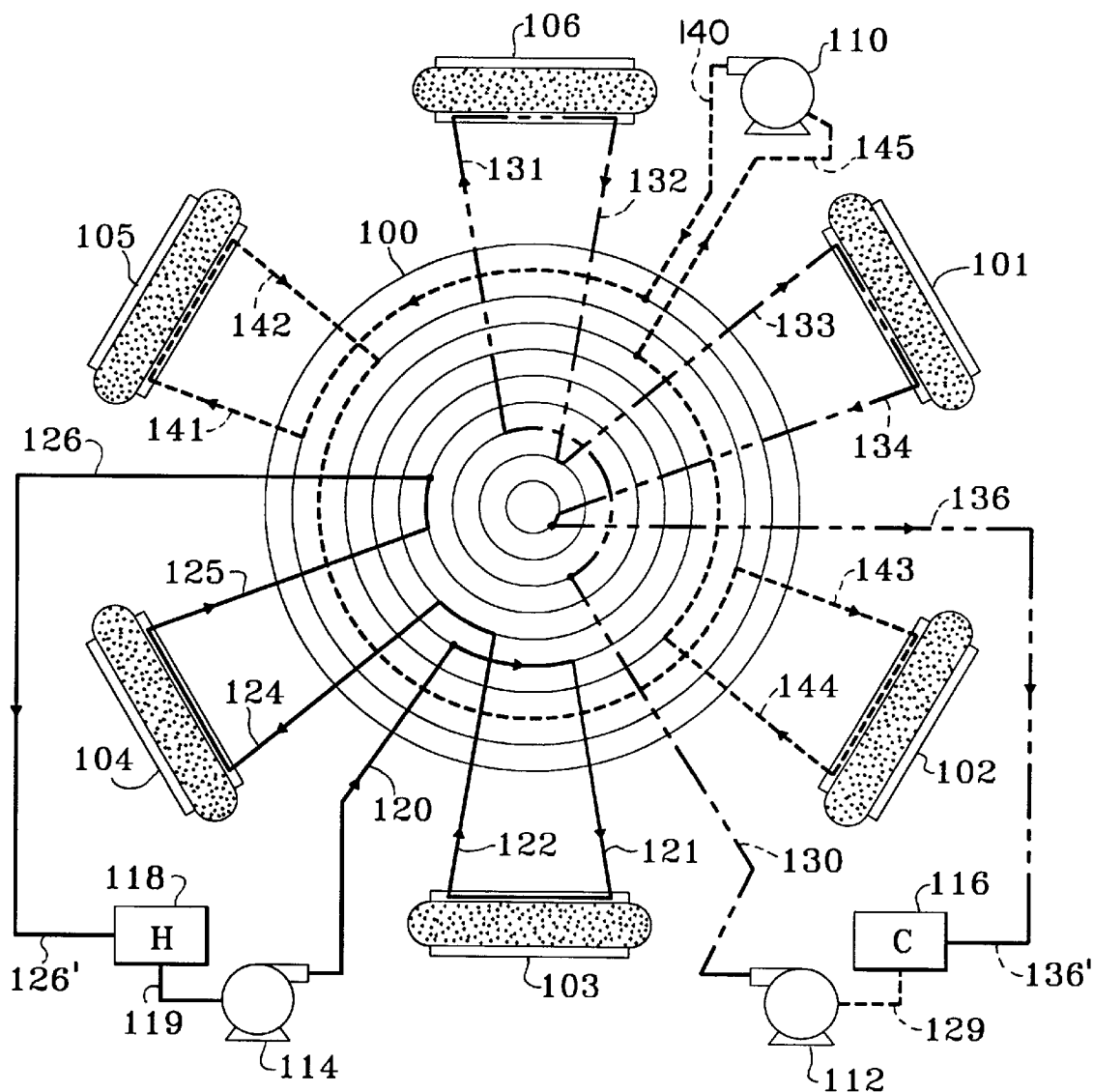
FIG. 2 depicts a flow scheme having 6 adsorbent zones and the rotary distribution section.

FIG. 2 illustrates one example of how the heat transfer fluid is managed by a single rotary distribution valve section such as the center valve section R2 of FIG. 1 in a sorption cooling system with a 9 track rotary valve section. The heat transfer fluid on the hot side and the heat transfer fluid on the cold side may be the same material such as water or a mixture of water with a glycol, amine, or alcohol. In FIG. 2 adsorption zones 101 and 106 are operating in an adsorption mode, adsorption zones 104 and 103 are operating in a desorption mode, and adsorption zones 102 and 105 are operating in an intermediate mode. The hot heat transfer fluid 119 is available from a hot source 118 at or above a desorption temperature and the cold heat transfer fluid 129 is available from a cold source 116 at or below the adsorption temperature. In one position of the rotary distribution valve section 100, a portion of the hot heat transfer fluid is passed in line 119 to hot fluid pump 114 and hot fluid inlet 120 and line 121 to the heat transfer section of adsorbent zone 103 in the desorption mode. Although the heat transfer fluid can be introduced either co-currently (in the same direction as the refrigerant flow through the adsorbent zone) or counter-currently (in a direction opposite to the flow of refrigerant in the adsorbent zone), it is preferred that the heat transfer fluid is passed counter-currently to the direction of refrigerant flow within the adsorbent zone to produce a first exchanged stream 122. The first exchanged stream 122 is passed to a second adsorption zone 104 in the desorption mode through the rotary valve section 100 via line 122 and line 124 to provide a second exchanged stream 125. The second exchanged stream 125 is returned to the hot source 118 through the rotary valve via line 125 and the hot fluid outlet and line 126' to complete the hot fluid circuit. Simultaneously, the cold heat transfer fluid is passed from the cold source 116 via line 129 to the cold fluid pump 112 and cold source inlet 130 to the rotary valve and passed to adsorbent zone 106 via line 131 to cool adsorbent zone 106 and provide a first heated stream 132. As in the hot fluid introduction steps described hereinabove, the cold heat transfer fluid is introduced to the adsorbent zones undergoing adsorption in a direction which is counter-current to the flow of refrigerant in the adsorbent zone. The first heated stream 132 is returned to the rotary valve section 100 via line 132 and passed via line 133 to adsorbent zone 101 wherein the first heated stream 133 is further heated to provide a second heated stream 134. The second heated stream 134 is returned to the cold source 116 via the cold source outlet 136 and line 136', completing the cold heat transfer fluid circuit. Simultaneously and separately, the heat transfer fluid in adsorbent zone 102 which had completed the desorption step and was depleted of refrigerant is exchanged with the heat transfer fluid in adsorbent zone 105 which had recently completed an adsorption step. Adsorbent zones 102 and 105 are in an intermediate mode wherein heat transfer fluid remaining in the adsorption zones at temperatures between the hot source temperature and the cold source temperature are interchanged to preheat adsorption zone 105 and precool adsorption zone 102. In the intermediate mode, a portion of the hot heat transfer fluid from adsorbent zone 102 is withdrawn via line 144 and passed to the rotary valve section 100 and thereupon passed to adsorbent zone 105 via line 141 wherein the cool heat transfer fluid in adsorbent zone 105 is withdrawn in line 142 and returned to rotary valve section 100 before being passed via the pump around outlet 145 to recirculation pump 110. Pump around inlet 140 returns the warm heat transfer fluid to the rotary valve section 100.

The above process steps are continued simultaneously at each position of the rotary valve inner rotors which rotate clockwise in FIG. 2. At an appropriate time, the valve is switched or stepped to the next position wherein the last adsorbent zone 104 in the desorption mode is placed in the intermediate mode wherein the adsorbent zone 104 is precooled prior to beginning the adsorption mode, and adsorbent zone 105 is switched to the full adsorption mode. Simultaneously, the last adsorbent zone 101 is switched from the adsorption mode to the intermediate mode and adsorbent zone 102 begins the desorption mode. The rotary valve continues to switch or step its sequence through all of the adsorbent zones to provide a continuous cooling process.

In one embodiment of the invention and with reference to FIG. 1, the heat transfer fluid is managed by the heat transfer fluid portion of rotary valve section R2 while a top rotary valve section R3 moving in sequence controls the flow of the refrigerant in lines C1–C6. In the adsorption and intermediate modes, the top rotary valve section R3 is closed, and during the desorption mode, the top rotary valve section R3 is open to permit refrigerant vapor to flow to the condenser 16 via lines 12 and 14. Simultaneously, a bottom rotary valve section R1 controls the flow of the refrigerant from the evaporator 26. The bottom rotary valve section R1 only permits flow of refrigerant from the evaporator 26 through lines 30 and 32 to the adsorbent zones 1–6 through lines E1–E6 when that particular adsorbent zone is in the adsorption mode. In an alternate operation, the bottom rotary valve section can be replaced by a system of conduits and check valves to permit refrigerant flow from the evaporator 26 to the adsorbent zones 1–6 through lines E1–E6 when that particular adsorbent zone is undergoing the adsorption stroke.

Figure 4:
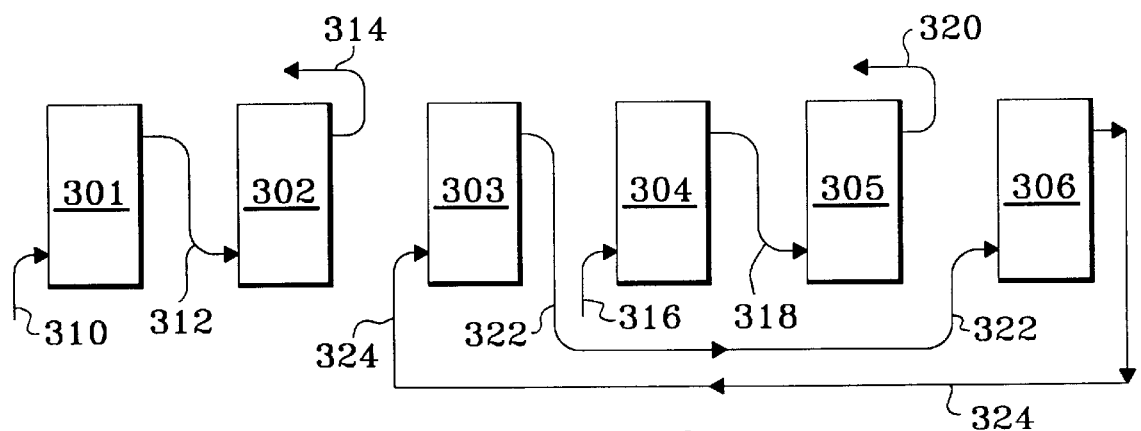
FIG. 4 is a schematic flow diagram of the heat transfer fluid routing for an alternate flow scheme having 6 sorption zones.

With reference to FIG. 4 the heat transfer fluid circulation is illustrated for a 6 sorption zone system wherein the hot and cold streams are each passed to the heat transfer zones of 2 sorption zones prior to returning the hot and cold exit streams to the hot source and the cold source, respectively, and the remaining 2 sorption zones operate in an intermediate mode wherein a recirculation stream is recirculated through the 2 sorption zones. In FIG. 4, the hot stream 310 is passed to the heat transfer zone of a first sorption zone 301 undergoing desorption and a first hot exit stream 312 is withdrawn. The first hot exit stream 312 is passed to a second sorption zone 302 undergoing desorption and a second hot exit stream 314 is withdrawn and returned to the hot source (not shown). The cold stream 316 is passed to sorption zone 304 undergoing adsorption and a first cold stream 318 is withdrawn. The first cold stream 318 is passed to sorption zone 305 undergoing adsorption and a second cold stream 320 is withdrawn and returned to the cold source (not shown). A first recirculation stream 324 is passed to sorption zone 303 undergoing an intermediate mode and a second recirculation stream 322 is withdrawn. The second recirculation stream 322 is passed to sorption zone 306 and the first recirculation stream 324 is returned to sorption zone 303. This scheme with 2 sorption zones is undergoing desorption. Two sorption zones undergoing adsorption and two sorption zones in an intermediate mode provide a surprisingly high COP.

Figure 3:
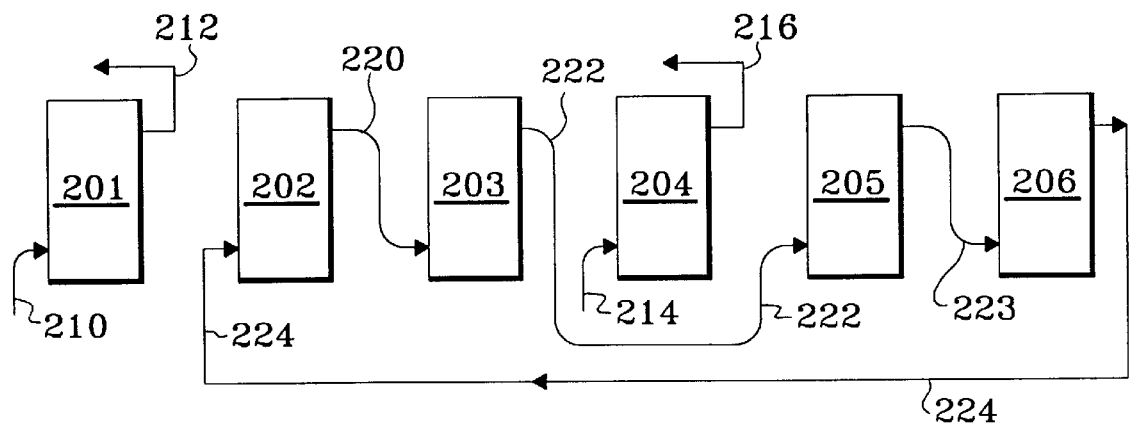
FIG. 3 is a schematic flow diagram of the heat transfer fluid routing for a flow scheme having 6 sorption zones.

With reference to FIG. 3, the heat transfer fluid circulation is shown for a 6 sorption zone system. In FIG. 3 a hot heat transfer stream 210 at a hot temperature is passed to the heat transfer zone of a first sorption zone 201 operating in the desorption mode and a hot exit stream 212 in withdrawn at a hot outlet temperature and returned to a hot source (not shown) at a hot outlet temperature. A cold heat transfer stream 214 at a cold temperature is passed to the heat transfer zone of another sorption zone 204 operating in an adsorption mode and a cold exit stream 216 is withdrawn at a cold outlet temperature and returned to a cold source (not shown). The remaining sorption zones 202, 203, 205, and 206 operate in an intermediate mode wherein a recirculation stream is circulated through the heat transfer zones from the sorption zone 202 to sorption zone 203 via line 220, from sorption zone 203 to sorption zone 205 via line 222, from sorption zone 205 to sorption zone 206 via line 223, and from sorption zone 206 to sorption zone 202 via line 224. In this scheme the hot stream and the cold stream are each passed to only one sorption zone prior to returning the hot exit stream to the hot source and the cold exit stream to the cold source. At the completion of each cycle the sorption zones are advanced one position by the indexing of the rotary valve controlling the heat transfer fluid distributor. Surprisingly, this scheme resulted in the highest COP.

Figure 5:
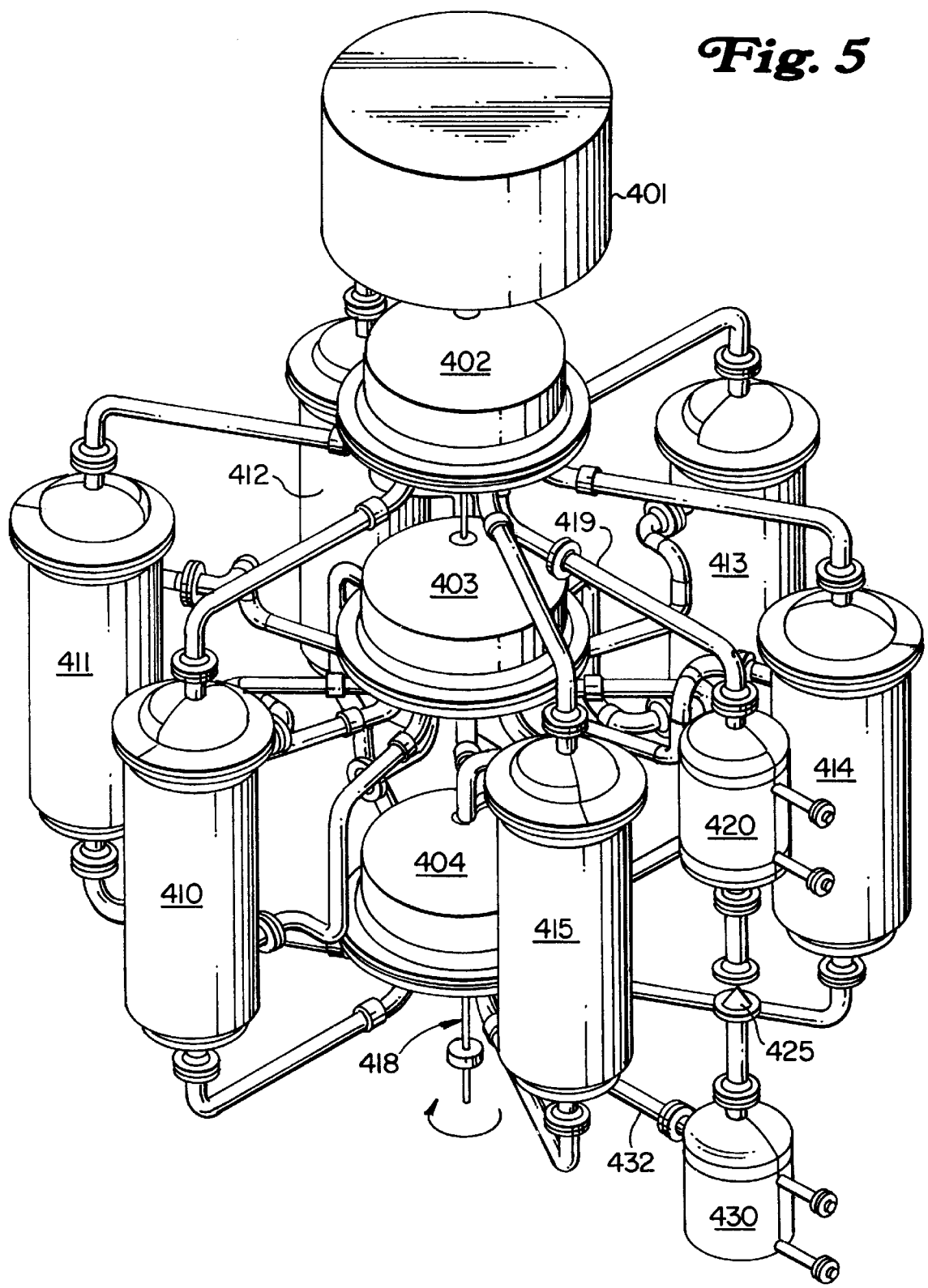
FIG. 5 is an isometric diagram for an apparatus for the present invention.

With reference to FIG. 5, an apparatus for carrying out the present invention is illustrated. An indexing motor 401 is shown with a shaft 418 which connects rotary valve zones 402, 403, and 404 so that all three zones move in unison. Conduit 419 is used to convey desorbed refrigerant from the adsorption zones of sorption zones 410, 411, 412, 413, 414, and 415 to the condenser 420. Condensed refrigerant is passed from condenser 420 through an expansion valve 425 to an evaporator 430. Revaporized refrigerant is returned to the sorption zones via conduit 432 and rotary valve zone 404.

Figure 6:
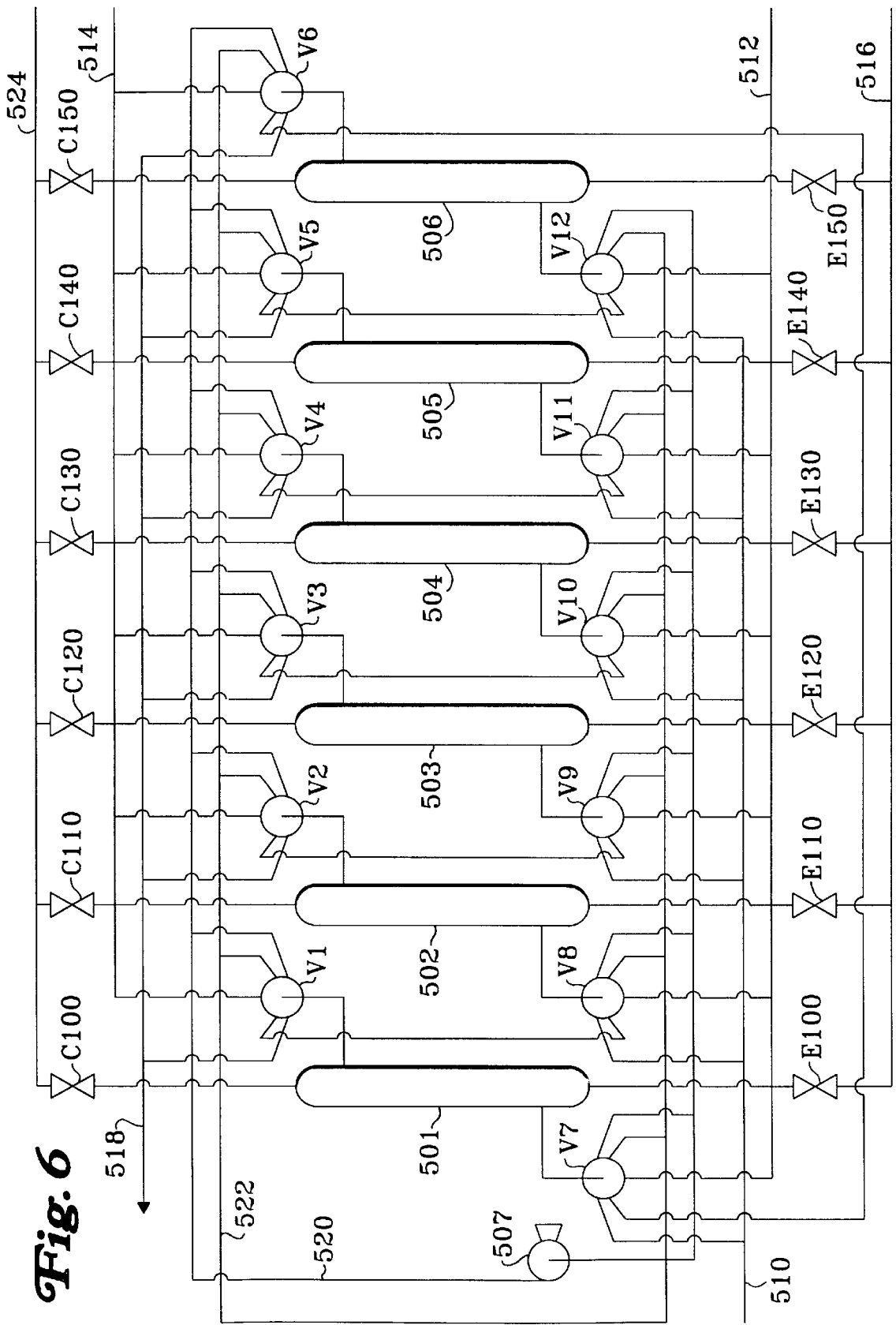
FIG. 6 is a schematic block flow diagram of an apparatus for implementing the schemes depicted in FIG. 3 and FIG. 4.

FIG. 6 is a schematic block flow diagram illustrating how the process of the present invention may be implemented with multi-port valves V1–V12 to control the routing of the hot, cold and recirculation fluids among the sorption zones 501–506 to operate according to the sorption cooling schemes shown in FIG. 3 and FIG. 4. Although any combination of single or multi-port valves may be employed, this system is preferably employed with as few valves and lines as possible to minimize sensible heat losses. The hot fluid stream is passed to the system in line 510, and the hot exit stream is withdrawn from the system in line 518 to be returned to the hot source (not shown). The cold stream is passed to the system from a cold source (not shown) in line 512, and the cold exit stream is withdrawn from the system in line 514. A recirculation stream is passed from pump 507 in line 520 to provide recirculation among the sorption zones undergoing the intermediate mode operation. The vapor produced in the evaporator (not shown) is introduced in line 516 and passed to the evaporation valves E100 to E150 which provide evaporation vapor to the appropriate sorption zone or zones undergoing the adsorption mode operation. The desorbed vapor produced in the desorption mode is withdrawn from the system in line 514 following the passage of the desorbed vapor from the appropriate sorption undergoing desorption and passage of the desorbed vapor through one or more of the corresponding desorption vapor valves C100–C150 which permit the desorbed vapor to be passed to the condenser (not shown) in line 524.

EXAMPLES

The invention will be further clarified by a consideration of the following examples, which are intended to be purely exemplary of the use of the invention.

Example I

In the article titled "Internal Regeneration of the Adsorption Process" by Aittomaeki and Haerkoenen referred to hereinabove on page 61, the authors introduce a parameter, β which is a non-dimensional parameter which describes the temperature level of the outflowing fluid from the adsorbent reservoirs (or beds) using an ideal thermal wave cycle during the desorption mode as follows:

$$\beta = \frac{T_{fmax} - T_{fz}}{T_{fmax} - T_{fmin}}$$

where $T_{fmin}$ and $T_{fmax}$ are the minimum (cold) and the maximum (hot) temperatures of the heat transfer fluid and $T_{fz}$ is the temperature of the hot exit fluid before it is returned to the hot source. According to the authors, a maximum COP of about 1.13 occurs for the regenerative or desorption mode at a β of about 0.6. If β is decreased to 0.4, the regeneration efficiency is increased, but the COP drops to about 1.05.

Example II

A sorption cooling apparatus with 6 sorption zones is assembled to measure the cooling power, or heat removal rate potential of the present invention. Each sorption zone consists of about a 30.5 cm (12 inches) length of a 19 mm (¾ inches) outside diameter steel tubing with a wall thickness of about 0.089 cm. The inside of the tubing is uniformly coated with a sorbent layer of about 0.1 mm thick. The sorbent comprises a low cerium rare earth exchanged LZ-210 zeolite adsorbent and a clay binder. The outside of the tube is contained in a jacket to form a separate heat transfer zone. Water is employed as the refrigerant and the cycle time is about 3 minutes. The heat transfer zones of the six sorption zones are connected with multi-port valves and piping as illustrated in FIG. 6 to operate as the scheme illustrated in FIG. 3 wherein the hot fluid and the cold fluid each flow to one desorbing or adsorbing sorption zone while a recirculation stream is passed sequentially through the remaining four sorption zones. At a lift or temperature difference between the evaporator temperature and the condenser temperature of about 28° C., the average hot exit temperature is about 104° C. (220° F.) and the average cold exit temperature is about 48° C. (118° F.). The hot fluid temperature is about 127° C. These conditions produce an evaporator temperature of about 2° C. and a condenser temperature of about 29° C. Based on this engineering simulation, it is determined from outlet temperature of the hot stream and the above relationship described in Example I that the sorption cooling system of the present invention operates with a non-dimensional β of about 0.22 and achieves a heating COP of about 2.08. This result was surprisingly more than twice the heating COP values achieved by the thermal wave devices of the prior art as shown in Example I.

Example III

The 6 sorption zones of Example II are reconnected to correspond to the scheme illustrated in FIG. 4 using multi-port valves and piping as shown in FIG. 6 such that the hot stream and the cold stream are each passed sequentially through the heat exchange zones of two sorption zones prior to return of the hot and the cold exit streams to the hot source and the cold source. The average hot exit stream temperature is about 95° C. and the average cold exit stream temperature is about 59° C. for the same temperature lift and maximum and minimum temperatures of Example II. The non-dimensional β corresponding to these conditions is about 0.32 and the corresponding heating COP value is determined to be about 1.77. Again, these results are surprising in producing a heating COP almost 70 percent higher than the thermal wave results of Example I, at a β value about 20 percent below the lowest β reported for the thermal wave system of Example I.

Example IV

An externally sorbent coated finned tube section was prepared according to the procedure disclosed in U.S. Pat. No. 5,518,977 (hereby incorporated by reference), except that the tube section had helical fins and was coated on the outside surface. Finned tube sections of aluminum tubing, each approximately 30.5 cm (12 inches) in length and having an outside diameter of about 19 mm (¾ inches) with about 11, 13 mm high helical fins per 2.5 cm (1 inch) of length were chemically etched prior to applying the coating. The tube sections were washed with 10% sodium hydroxide solution and a 6.5% nitric acid solution, each wash followed by a water rinse at room temperature. The tube sections were dried and heat treated by heating the tube sections to about 100° C. for about 1 hour. The tube sections were then heated in and oven to a temperature of about 350° C. and allowed to cool to room temperature. The tube sections were then immersed in a slurry comprising a low cerium rare earth exchanged LZ-210 zeolite and a clay binder for about 5 minutes. The tube sections were drained, and dried in air. The coated tube sections were heated gradually to a temperature of about 350° C. for a about 1 hour and allowed to slowly return to room temperature. The finished tube sections had a uniform coating of about 0.007 cm (0.003 inches) thickness with a density of about 0.83 g/cc, and an overall surface area of about 133 cm²/cm (4.36 ft²/ft).

Example V

Two sorbent coated finned tube sections of Example IV were mounted vertically in two separate heat exchanger shells to create two sorption zones which permit heating and cooling water to be passed on the tube side of the tube sections and a refrigerant to be adsorbed and desorbed on the shell side passage. The shell and tube heat exchanger was connected to a condenser and an evaporator. Valves were provided at the top and the bottom of each of the shell side passages to permit the flow of refrigerant to the condenser or from the evaporator to the sorption zones. The shell side passages of the system were evacuated and one of the sorption zones permitted to come to equilibrium with water vapor from the evaporator. Water was used as the heat transfer fluid at a rate of 0.027 m³/h (1.2 gpm) at a hot temperature of about 85° C. and a cold temperature of about 22° C. When the first sorption zone was heated, a valve at the top of the shell side passage was opened to allow desorbed water vapor to flow to the condenser. The water vapor was condensed at a temperature of about (22° C.), and the condensate passed through an expansion valve to reduce the pressure. The reduced pressure condensate was passed to the evaporator over which was passed an ambient air stream at an air flow rate of about 6 m³/h (3.5 cfm ) resulting in an evaporator temperature of about 1° C. The water vapor produced by the evaporator was passed to the second sorption zone which was being cooled with a cold water stream. The two sorption zones were operated cyclically in an alternating fashion wherein one sorption zone was heated to desorb refrigerant, while the other was cooled to adsorb the refrigerant. When the second sorption was cooled with water at ambient temperature (22° C.), the valve at the top of the shell side passage of the second sorption zone was closed and the valve at the bottom of the second shell side passage was opened to permit water vapor to flow from the evaporator. This cycle was repeated at about 4 minute intervals to produce cooling of the air stream at a rate of about 754 watts/kg of adsorbent (1167 BTU/h/lb).

Example VI

A two bed sorption cooling system operating in a conventional two bed cycle without an intermediate stroke to produce about 70 kW (about 20 tons) of refrigeration is considered at variations in tube section coating thickness and cycle time. The results of an engineering simulation based on the results of Example V are shown in Table 1. The thickness of the sorbent layer on the tube section varied between about 0.2 mm (0.007 inches) to about 0.46 mm (0.018 inches) and the cycle times increased from about 4 minutes to about 6 minutes. The thinner coating with about ⅓ less adsorbent than the thickest coated tube achieved the desired cooling capacity with the shortest cycle time.

TABLE 1

VARIATIONS IN COATING THICKNESS AND CYCLE TIMES

| Layer Thickness | Sieve Inventor | Cycle Time | Cooling Duty |
| --- | --- | --- | --- |
| 0.2 mm | 1.8 g/cm | 4 minutes | 78.4 kW |
| 0.4 mm | 3.9 g/cm | 4.5 minutes | 72.8 kW |
| 0.46 mm | 5.0 g/cm | 6 minutes | 74.2 kW |

Example VII

A further simulation of the externally coated 13 mm high fins on 25 mm outside diameter helical finned tubes at two-fin spacings: 6 fins/25 mm and 11 fins/25 mm was developed in order to illustrate the relationship between cycle time and the thickness of the adsorbent coating. Table 2 illustrates the effect of increasing coating thickness on cycle time in minutes.

TABLE 2

| ADSORBENT THICKNESS mm | TIME TO REACH EQUILIBRIUM sec | CYCLE TIME min | N = 6 Kg/m | FIN DENSITY m/kw | N = 11 Kg/m | FIN DENSITY m/kw |
| --- | --- | --- | --- | --- | --- | --- |
| 0.4 | 50 | 2 | 1.1 | 2.25 | 2.0 | 1.24 |
| 0.8 | 100 | 4 | 2.2 | 2.25 | 4.0 | 1.24 |

The results of the simulation in Table 2 shows that for an increase in adsorbent coating thickness of from about 0.4 mm to about 0.8 mm, the cycle time has to increase by a factor of about 2 to achieve the same cooling power and that increasing the number of fins from 6 to 11 per 25 mm reduces the tube length required by about 55 percent. The gap between the fins at 11 fins per 25 mm and a fin thickness of about 0.5 mm is about 1.98 mm which is not blocked by a coating of about 0.8 mm. However, the time for the finned tube to reach equilibrium has doubled over the 0.4 coating thickness indicating increasing temperature gradients in the coating layer. Thus, in order to avoid thermal gradients in the tubing, the coating thickness must be less than half the space between the fins.

We claim:

1. A process for sorption heating and cooling comprising the following steps:
   a. supplying a first hot stream to a first sorption zone of at least 2 sorption zones, each sorption zone comprising a heat transfer zone and a separate adsorption zone, said adsorption zone containing a sorbent, said heat transfer zone being in intimate indirect thermal contact with said adsorption zone to permit an essentially uniform temperature throughout said sorption zone to desorb a refrigerant vapor from the adsorption zone of said first sorption zone at an upper pressure and provide a hot exit stream from the heat transfer zone of said first sorption zone;
   b. passing the refrigerant vapor stream to a cooler and condenser zone to provide a condensate stream, reducing the pressure of the condensate stream to a lower pressure to provide a reduced pressure condensate, and passing the reduced pressure condensate to an evaporator zone to provide a revaporized refrigerant stream;

c. passing a cold stream to the heat transfer zone of a second sorption zone and recovering a cold exit stream, and simultaneously conducting the revaporized refrigerant stream to the adsorption zone of said second sorption zone to adsorb the revaporized refrigerant;

d. simultaneously terminating the passing of refrigerant vapor from said first sorption zone, terminating the passing of said hot stream to the heat transfer zone of said first sorption zone, terminating the passing of the cold stream to the second sorption zone, and passing a recirculation stream between the heat transfer zone of the first sorption zone and the heat transfer zone of the second sorption zone; and e. repeating the above steps (a) through (d) to provide a sorption cooling or heating cycle wherein said first sorption zone and second sorption zone alternately undergo a desorption stroke in step (a), an adsorption stroke in step (c), and an intermediate stroke in step (d) between alternate adsorption and desorption strokes.

2. The process of claim 1 wherein said process comprises at least 6 sorption zones wherein at least two sorption zones simultaneously undergo the adsorption stroke, at least two sorption zones simultaneously undergo the desorption stroke, and at least two sorption zones are simultaneously undergoing the intermediate stroke to provide a continuous sorption heating and cooling process.

3. The process of claim 1 further comprising returning the hot exit stream to a hot source and returning the cold exit stream to a cold source.

4. The process of claim 3 further comprising passing the hot exit stream through the heat transfer zone of at least two sorption zones simultaneously undergoing the desorption stroke prior to returning said hot exit stream to said hot source.

5. The process of claim 1 further comprising returning the hot exit stream to a hot source to provide said hot stream.

6. The process of claim 1 further comprising returning the cold exit stream to a cold source to provide said cold stream and cooling the hot exit stream to provide said cold stream.

7. A process for sorption heating and cooling comprising the following steps:

a. supplying a first hot stream through a first rotary valve section to a first sorption zone of at least 2 sorption zones, each sorption zone comprising a heat transfer zone and a separate adsorption zone, said adsorption zone containing a sorbent, said heat transfer zone being in intimate indirect thermal contact with said adsorption zone to permit an essentially uniform temperature throughout said sorption zones to desorb a refrigerant vapor from the adsorption zone of said first sorption zone at an upper pressure and provide a hot exit stream from the heat transfer zone of said first sorption zone;

b. passing the refrigerant vapor stream through a second rotary valve section to a cooler and condenser zone to provide a condensate stream, reducing the pressure of the condensate stream to a lower pressure to provide a reduced pressure condensate, and passing the reduced pressure condensate to an evaporator zone to provide a revaporized refrigerant stream;

c. passing a cold stream through said first rotary valve section to the heat transfer zone of a second sorption zone and recovering a cold exit stream, and simultaneously conducting the revaporized refrigerant stream through a third valve zone to the adsorption zone of said second sorption zone to adsorb the revaporized refrigerant;

d. advancing said second rotary valve section to terminate the passing of refrigerant vapor from said first sorption zone through said second rotary valve section and advancing the first rotary valve section to simultaneously terminate the passing of said hot stream to the heat transfer zone of said first sorption zone and terminate the passing of the cold stream to the second sorption zone, and simultaneously through said first rotary valve section passing a recirculation stream between the heat transfer zone of the first sorption zone and the heat transfer zone of the second sorption zone; and e. indexing the position of the first and second rotary valve sections in unison to repeat the above steps (a) through (d) to provide a sorption cooling or heating cycle wherein said first sorption zone and the second sorption zone alternately undergo a desorption stroke in step (a), an adsorption stroke in step (c), and an intermediate stroke in step (d) between alternate adsorption and desorption strokes.

8. The process of claim 7 wherein the third valve zone comprises a check valve or a third rotary valve section.

9. The process of claim 7 wherein said process comprises at least 6 sorption zones wherein at least two sorption zones are undergoing the adsorption stroke, at least two sorption zones are undergoing the desorption stroke, and at least two sorption zones are undergoing the intermediate stroke and wherein the hot exit stream is passed through the first rotary valve section to another sorption zone undergoing the desorption stroke, and the cold exit stream is passed through the second rotary valve section to another zone undergoing the adsorption stroke to provide a continuous sorption cooling and heating process.

10. The process of claim 7 wherein the refrigerant vapor is selected from the group consisting of water, alcohols, ammonia, light hydrocarbons, and mixtures thereof.

11. The process of claim 7 wherein the sorbent comprises a solid sorbent selected from the group consisting of silica gel, activated carbon, clays, metallic salts, zeolite molecular sieves, and mixtures thereof.

12. The process of claim 7 wherein the sorbent is selected from the group consisting of zeolite A, zeolite X, zeolite Y, and mixtures thereof.

13. The process of claim 7 wherein the refrigerant vapor comprises water and the sorbent comprises zeolite Y.

14. The process of claim 7 wherein the sorbent is selected from the group consisting of zeolites Y-54, Y-74, Y-84, Y-85, low cerium rare earth exchanged Y-84, low cerium rare earth exchanged LZ-210, and mixtures thereof.

15. The process of claim 7 wherein said refrigerant vapor is water and the upper pressure ranges between about 2 kPa (15 torr) and about 20 kPa (150 torr), and the lower pressure ranges between about 0.6 kPa (46 torr) and about 2 kPa (15 torr).

16. A process for sorption heating and cooling comprising the following steps:

a. supplying a first hot stream through a first rotary valve section and a first conduit to a first sorption zone of at least 2 sorption zones, each sorption zone comprising a heat transfer zone and a separate adsorption zone, said adsorption zone containing a sorbent coated surface, said heat transfer zone being in intimate indirect thermal contact with said adsorption zone to permit an essentially uniform temperature throughout said sorption zones to desorb a refrigerant vapor from the adsorption zone of said first sorption zone at an upper pressure and provide a hot exit stream from the heat transfer zone of said first sorption zone;

b. passing the refrigerant vapor stream through a second conduit and a second rotary valve section to a cooler and condenser zone to provide a condensate stream, reducing the pressure of the condensate stream to a lower pressure to provide a reduced pressure condensate, and passing the reduced pressure condensate to an evaporator zone to provide a revaporized refrigerant stream;

c. passing a cold stream through said first rotary valve section and a third conduit to the heat transfer zone of a second sorption zone and recovering a cold exit stream, and simultaneously conducting the revaporized refrigerant stream through a fourth conduit and a third valve zone to the adsorption zone of said second sorption zone to adsorb the revaporized refrigerant;

d. advancing said second rotary valve section to terminate the passing of refrigerant vapor from said first sorption zone through said second conduit and said second rotary valve section and advancing the first rotary valve section to simultaneously terminate the passing of said hot stream through said first conduit to the heat transfer zone of said first sorption zone, to simultaneously terminate the passing of the cold stream through said third conduit to the second sorption zone, and to simultaneously circulate a recirculation stream through a fifth conduit, said first rotary valve section, and the heat transfer zone of the first sorption zone and returning said recirculation stream through a sixth conduit and said first rotary valve section to the heat transfer zone of the second sorption zone; and e. indexing the position of the first and second rotary valve sections in unison to repeat the above steps (a) through (d) to simultaneously alternate the conduits carrying the hot and cold streams, the refrigerant vapor and revaporized refrigerant stream, and the recirculation stream wherein the first and second sorption zones alternately undergo a desorption stroke, an adsorption stroke, and an intermediate stroke between alternate adsorption and desorption strokes to provide a continuous process.

17. The process of claim 16 further comprising exchanging heat between the evaporator zone and either a plant process stream or a conditioned space to provide heating or cooling of the process stream or the conditioned space.

18. The process of claim 16 further comprising heating the evaporator with a plant process stream selected from the group consisting of steam, water, hydrocarbons, fluid chemicals, air, gases and mixtures thereof.

19. A sorption cooling system comprising a condenser; an evaporator; at least two sorption zones each sorption zone containing a solid adsorbent selective for the adsorption of at least a portion of a refrigerant fluid, containing a heat transfer section in close indirect thermal communication with said solid adsorbent, and having a heat transfer fluid passage for a heat transfer fluid; a hot source; a cold source; a single rotary distribution valve for simultaneously and separately conveying the heat transfer fluid at a desorption temperature from the hot source to the heat transfer section of a first sorption zone in a desorption stroke to provide a desorbed refrigerant vapor and returning said hot heat transfer fluid to said hot source, for simultaneously and separately conveying a cold heat transfer fluid at an adsorption temperature from the cold source to a second sorption zone in an adsorption stroke and returning said cold heat transfer fluid to said cold source, for simultaneously terminating the flow of refrigerant vapor to or from said first and second sorption zones while separately circulating a recirculation fluid in an intermediate stroke between a sorption zone having completed the desorption stroke with the sorption zone having completed the adsorption stroke, for simultaneously and separately conveying at least a portion of said desorbed refrigerant vapor to the condenser to provide a condensate stream, for simultaneously and separately conveying said condensate stream to said evaporator under a reduced pressure to provide a vaporized refrigerant stream and for simultaneously and separately conveying said vaporized refrigerant stream from said evaporator to said second sorption zone in the adsorption mode; a conduit for conveying said condensate stream from said condenser to said evaporator; and a valve indexing driver to advance the single rotary distribution valve to simultaneously step the first sorption zone to the adsorption mode, simultaneously step the other sorption zone to the desorption mode, and simultaneously cycle and alternately convey the heat exchange fluid to and from the hot source and the cold source to provide a continuous sorption cooling system.

20. The sorption cooling system of claim 19 wherein said hot source comprises a hot temperature equal to or greater than said desorption temperature.

21. The sorption cooling system of claim 19 wherein said cold source comprises a cold temperature equal to or less than said adsorption temperature.

22. The sorption cooling system of claim 19 wherein said hot source comprises a temperature of about 80° C. to about 350° C. and said cold source comprises a temperature of about −10° C. to about 50° C.

23. The sorption cooling system of claim 19 wherein said single rotary valve comprises three valve sections: a first valve section, a second valve section, and a third valve section wherein the first valve section simultaneously distributes the hot heat transfer fluid and the cold heat transfer fluid; the second valve section simultaneously and separately distributes desorbed refrigerant vapor to said condenser from said first sorption zone; and the third valve section simultaneously and separately distributes said vaporized refrigerant to said other sorption zone.

24. The sorption cooling system of claim 19 wherein the single rotary distribution valve comprises a low thermal conductivity material.

25. The sorption cooling system of claim 24 wherein the low thermal conductivity material is selected from the group consisting of plastic, ceramic, laminated fiber, rubber, wood, stainless steel, glass, and combinations thereof.

26. The sorption cooling system of claim 19 wherein said system comprises from 3 to 20 sorption zones.

27. The sorption cooling system of claim 19 wherein said sorption zone comprises a shell and tube exchanger having a shell side passage and a tube side passage said tube side passage comprising tubes having an inside coating containing the solid adsorbent and the heat transfer fluid passage being within said shell side passage.

28. The sorption cooling system of claim 19 wherein said sorption zone comprises a shell and tube heat exchanger having a shell side passage and a tube side passage, said tube side passage comprising tubes having an outside surface including an outside coating of the solid adsorbent on the outside surface and the heat transfer fluid passage being within said tube side passage.

29. The sorption cooling system of claim 28 wherein said tubes comprise an extended tube surface.

30. The sorption cooling system of claim 29 wherein said extended surface comprises longitudinal or helical fins.

31. The sorption cooling system of claim 30 wherein said extended surface comprises an adsorbent inventory-to-tube length ratio of from about 0.1 to about 5 Kg/m.

32. The sorption cooling system of claim 19 wherein the heat transfer fluid comprises water or paraffin.

* * * * *